Figure 1:
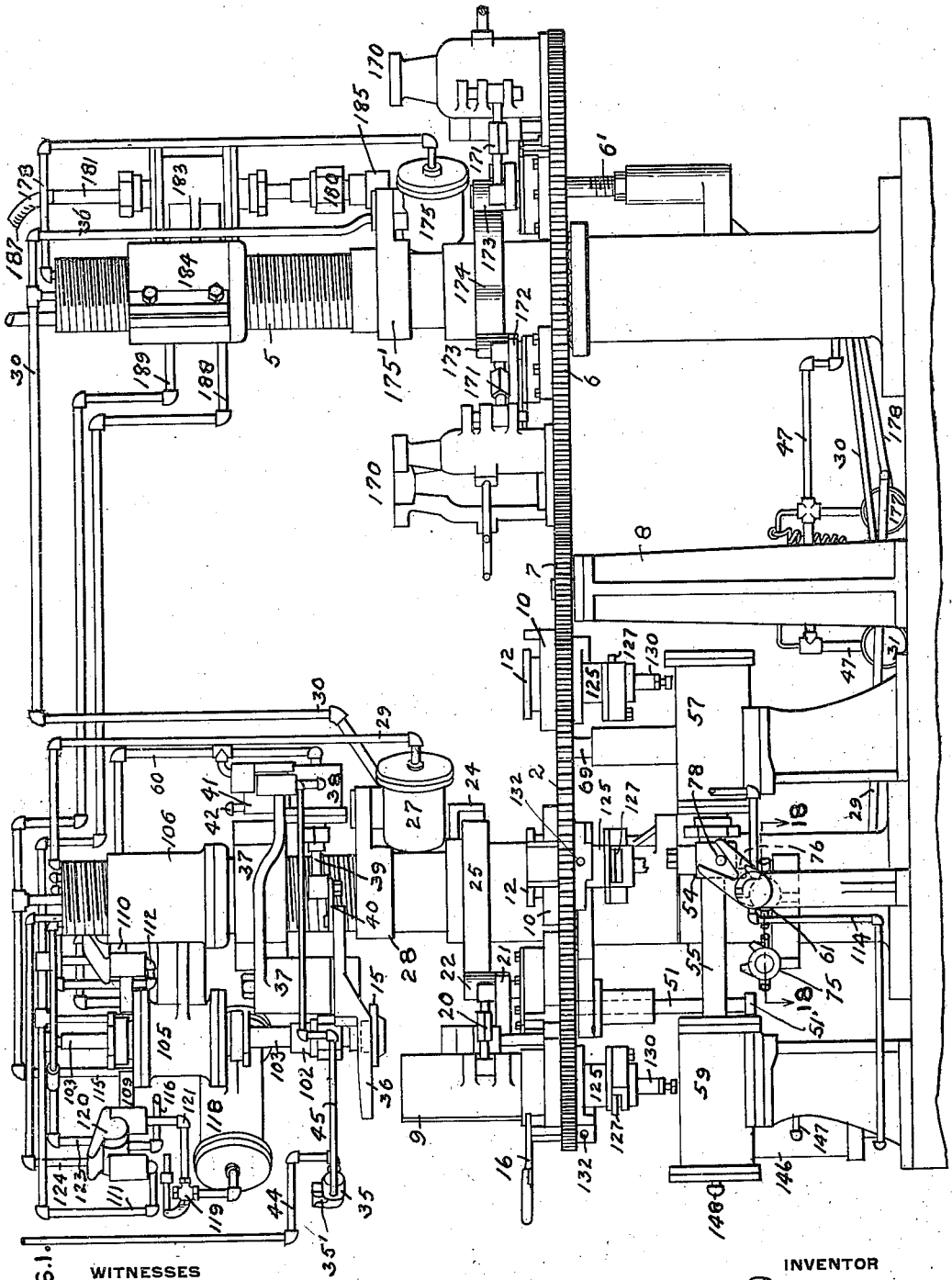

F. O'NEILL.
GLASS FORMING MACHINE.
APPLICATION FILED AUG. 6, 1914.

1,217,102.

Patented Feb. 20, 1917.
8 SHEETS—SHEET 2.

WITNESSES

INVENTOR

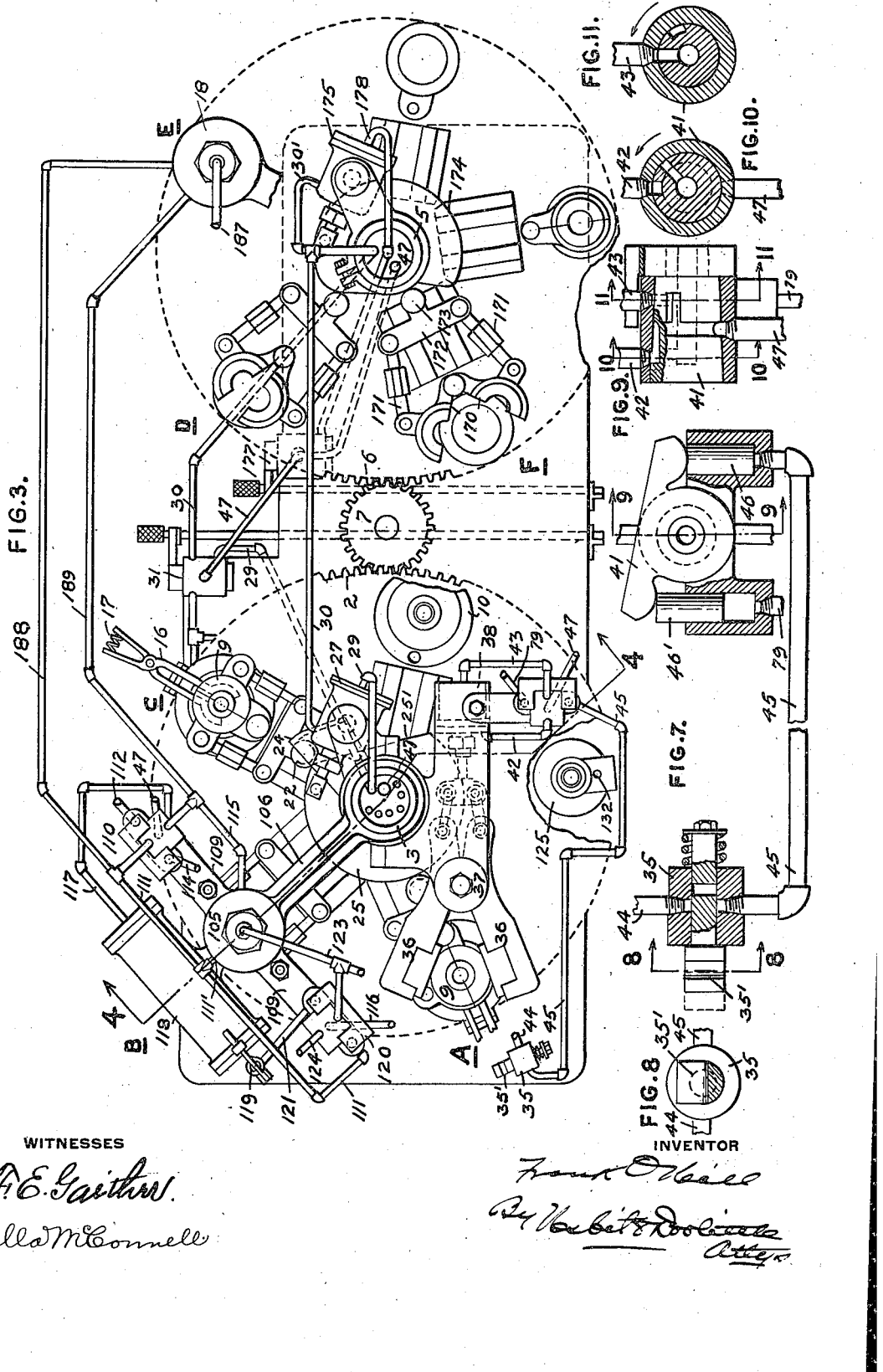

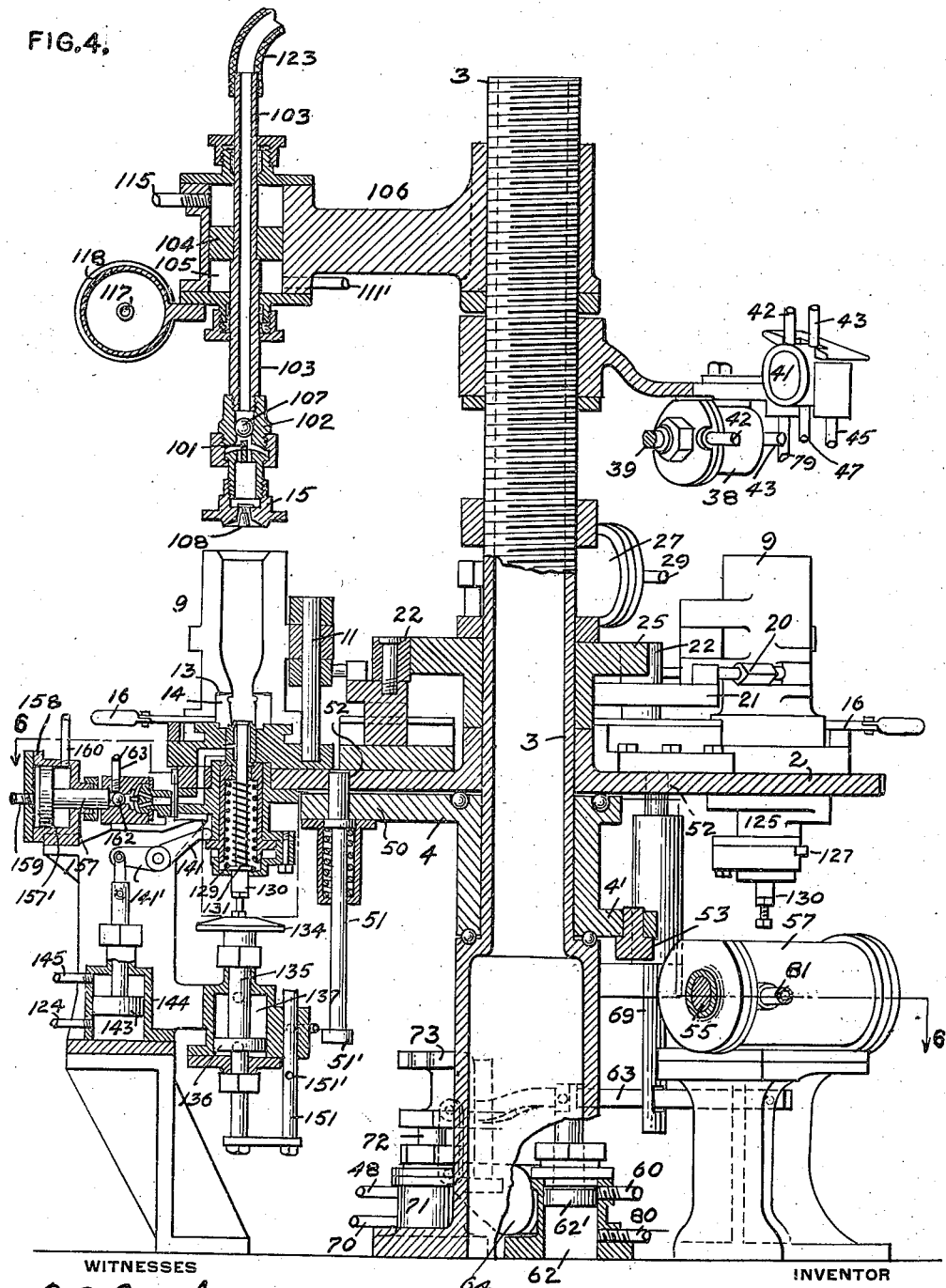

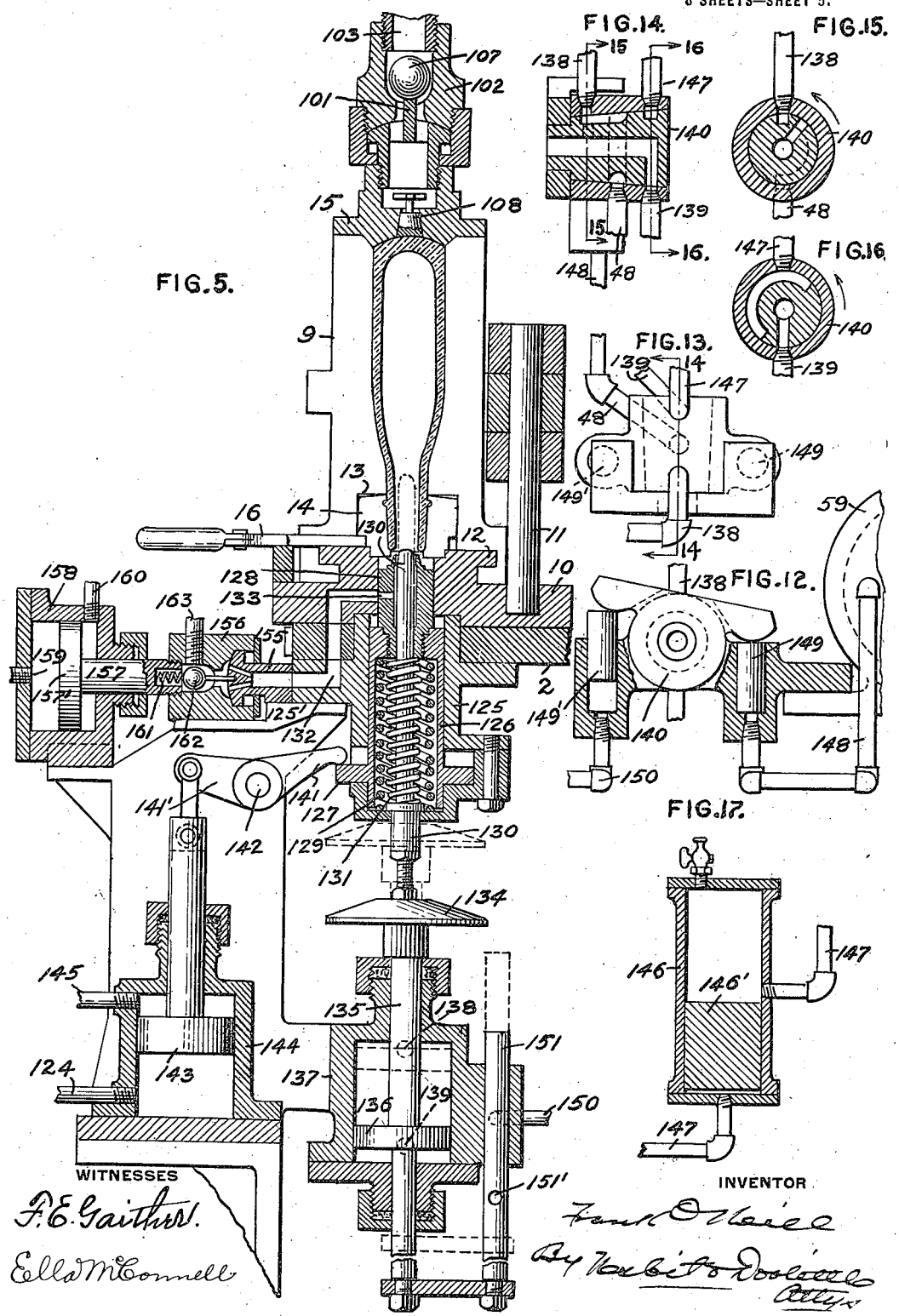

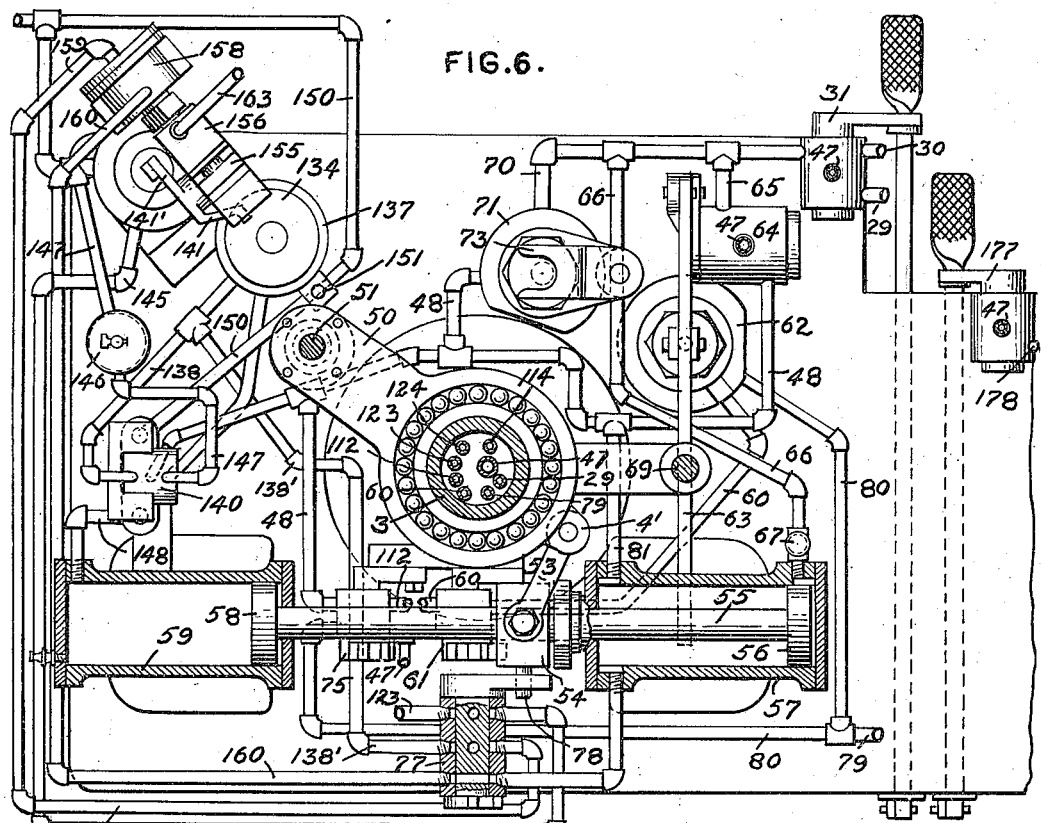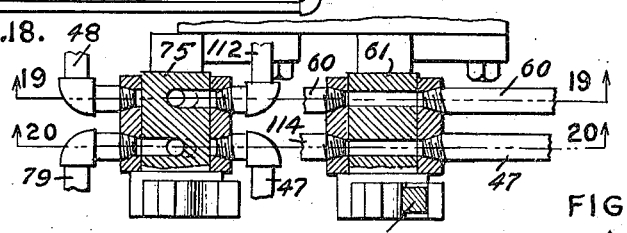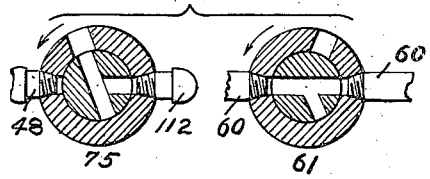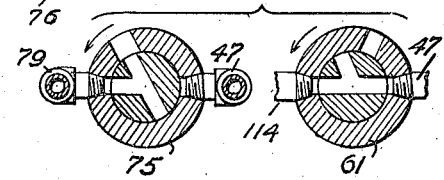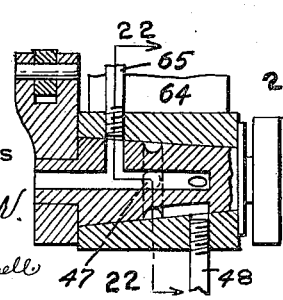

F. O'NEILL.
GLASS FORMING MACHINE.
APPLICATION FILED AUG. 6, 1914.
1,217,102.
Patented Feb. 20, 1917.
8 SHEETS—SHEET 7.
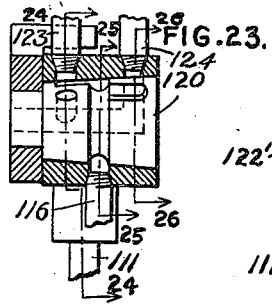
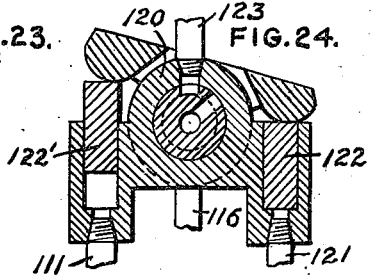
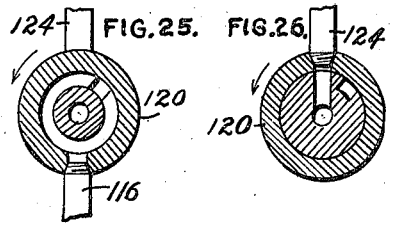
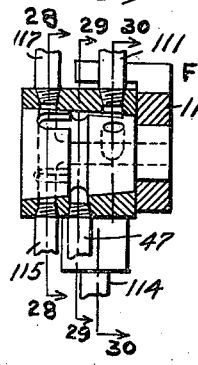
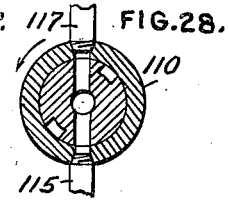
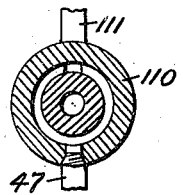
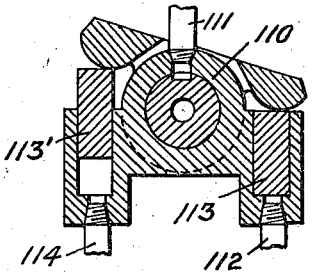
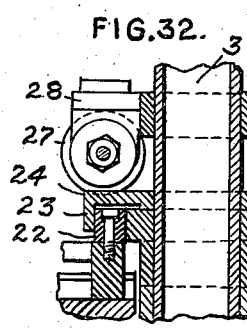
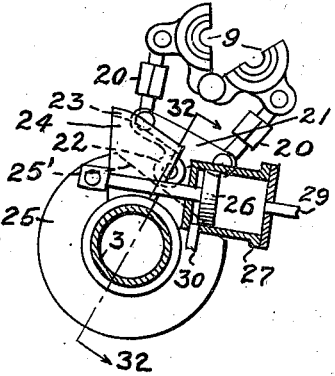
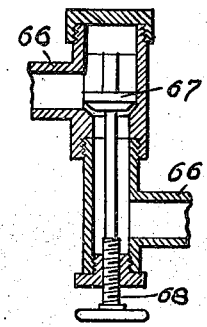
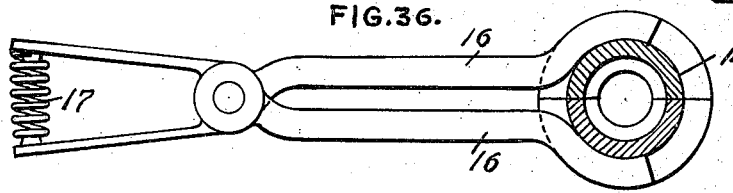
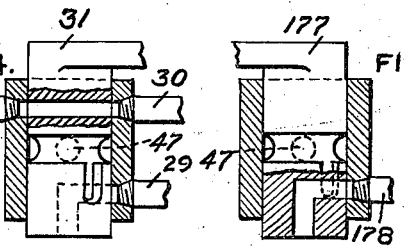
WITNESSES
INVENTOR

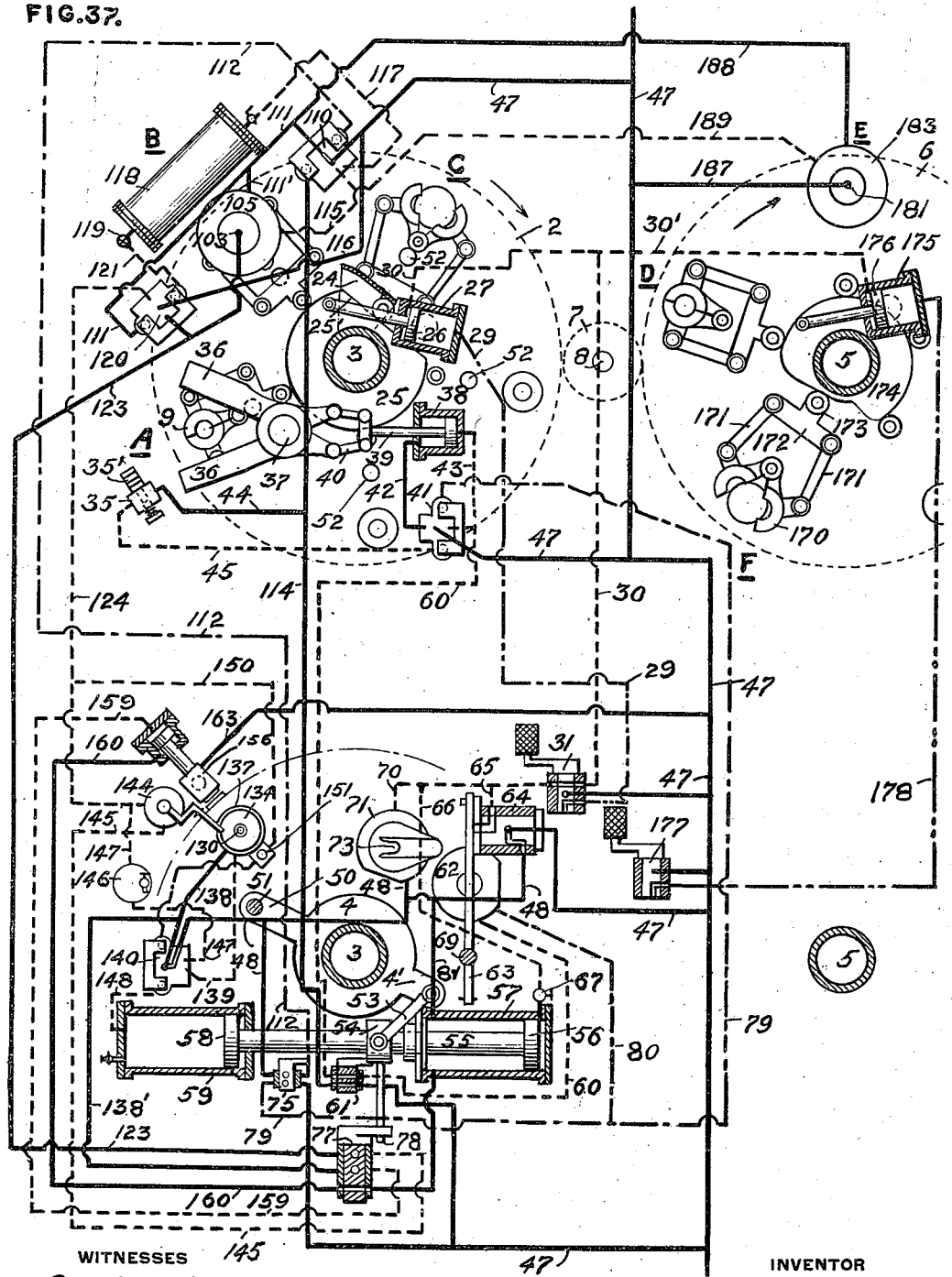

UNITED STATES PATENT OFFICE.

FRANK O'NEILL, OF TOLEDO, OHIO.

GLASS-FORMING MACHINE.

1,217,102.         Specification of Letters Patent.         Patented Feb. 20, 1917.

Application filed August 6, 1914. Serial No. 855,362.

*To all whom it may concern:*

Be it known that I, FRANK O'NEILL, a citizen of the United States, and resident of Toledo, in the county of Lucas and State of Ohio, have invented certain new and useful Improvements in Glass-Forming Machines, of which the following is a specification.

The object of this invention is to provide an improved machine wherein a blank for blowing is formed after depositing a quota of glass in a blank mold, the mechanism operating first to automatically sever the glass from the punty rod or gathering iron and then to advance the mold to position for forming the blank, the blank-forming operation proceeding automatically. During the advancing movement of the blank mold support, the mold containing the blank formed by the preceding operation is automatically opened so that the blank therein may be removed to a blow mold, and at another point on the blank mold carrier the automatic mechanism operates to close the blank mold in readiness to receive a charge of glass when such mold takes its turn in repeating the cycle of blank-forming operations.

A blow mold carrier is actuated in conjunction with the blank mold carrier, being geared thereto for synchronizing the movements, whereby the movement of successive blow molds to and from blowing position is accurately timed. A further result of gearing together the blank and blow mold carriers is that when a blank mold is in proper position to deliver a blank, a blow mold is at the same time in proper position to receive such blank. To facilitate the operation and minimize the manual labor incident to transferring the blanks, the blank and blow molds involved in each transferring operation are so positioned by their respective carriers that both are within convenient reach of the station occupied by the transfer boy. On the other hand, these molds must not be so close together as to impede the transfer operation, the latter requiring sufficient space to enable the operator to conveniently reverse the blank while transferring it, this being necessary as the blank is in inverted position in the blank mold, while in the neck mold its neck end is uppermost. In the apparatus of the present invention the space at the side of the machine necessary for the most effective work by the transfer boy is secured by spacing apart the blank and blow mold carriers and connecting them by suitable interposed gearing. This results in rotating each carrier in the desired direction, and in so placing the blank and blow molds that from his station at the side of the machine both the blank and blow molds are within convenient reach of the operator, and at the same time ample space is provided for turning or inverting the blank while transferring it.

The molds become very hot, frequently attaining a cherry red heat, and unless the active molds are separated a substantial distance the work of the transfer boy is rendered unbearable, his station being necessarily so close to the molds that when the latter are closely adjacent each other an enormous amount of heat is radiated in such a restricted area that its effect is substantially the same as from a single large mass of iron even though in fact it is produced by two separate and distinct molds. By separating the molds as herein proposed there is opportunity for the heat to become dissipated; also with the molds thus separated it is unnecessary for the operator to expose his hands and arms to the hot molds and mold projections as is unavoidably the case when the molds which he is manipulating are close to each other. And a further characteristic of the machine is the automatic controlling and timing of the so-called blowing heads for the blank and blow molds, the blank mold head operating to close such mold for the glass packing and blank-expanding operations, and the head for the blow mold controlling the flow of air for blowing the blank into final form. All of the automatic operations are performed by compressed air, the several air circuits being so arranged as not to be interfered with by the intermittent rotary movement of the mold carriers.

In the adaptation of the machine here illustrated the blank and blow mold carriers are each adapted to accommodate five molds which, respectively, are successively presented for the cycles of operations incident to forming the blanks and to blowing them. It will be understood, however, that the number of molds may be increased or diminished without departing from the invention.

Figure 2:
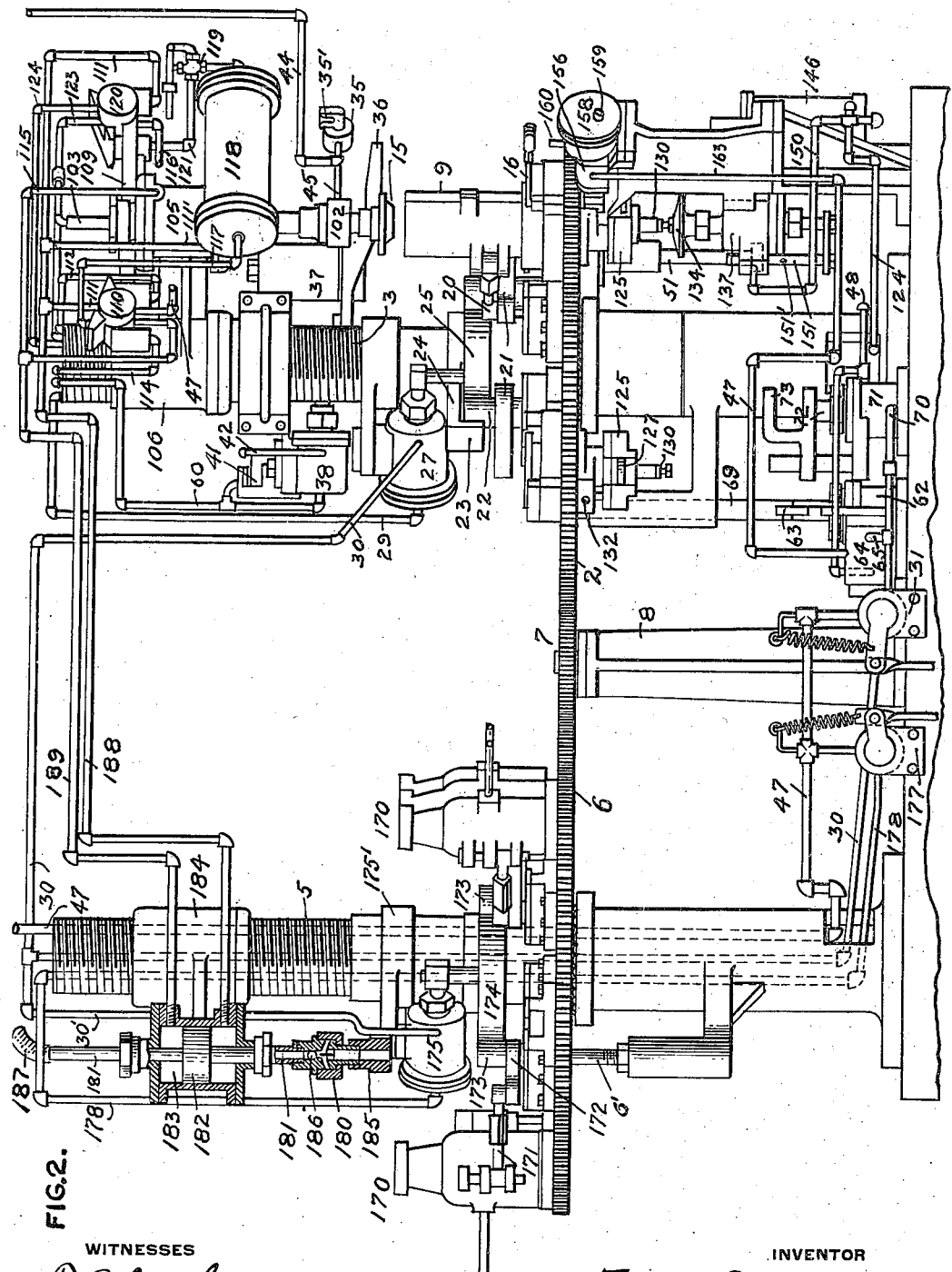

In the accompanying drawings, Figures 1 and 2 are side elevations of the machine taken, respectively, at opposite sides thereof, many of the air circulating pipes and several of the molds being omitted. Fig. 3 is a plan view of the machine. Fig. 4 is a vertical section of the blank-forming portion of the machine, taken on line 4—4 of Fig. 3, and Fig. 5 is a similar section, drawn to a larger scale, illustrating the positions of the parts during the operation of expanding a blank in the blank mold. Fig. 6 is a sectional plan taken on the irregular line 6—6 of Fig. 4. Fig. 7 is a sectional detail of the punty-operated valve, together with one of the oscillating valves in communication therewith, and Fig. 8 is a sectional elevation of the punty valve, taken on line 8—8 of Fig. 7. Figs. 9, 10 and 11 are sectional views of the oscillating valve illustrated in Fig. 7, the section of Fig. 9 being indicated by line 9—9 of Fig. 7, and the sections of Figs. 10 and 11 by the lines 10—10, and 11—11, respectively, of Fig. 9. Fig. 12 is a sectional detail of the oscillating valve which controls the passage of air to the plunger operating cylinder, and Fig. 13 is a top plan of the same. Figs. 14, 15 and 16 are sections of the valve illustrated in Figs. 12 and 13, Fig. 14 being taken on line 14—14 of Fig. 13, and Figs. 15 and 16 on lines 15—15 and 16—16, respectively, of Fig. 14. Fig. 17 is a sectional elevation of the timing tank which controls the flow of air through the valve illustrated in Figs. 12 to 16, inclusive, to the plunger-operating cylinder. Fig. 18 is a sectional plan of the two so-called butterfly valves which are actuated by the mold-table oscillating mechanism, the plane of section being indicated by line 18—18 of Fig. 1. Figs. 19 and 20 are cross-sections of the valves of Fig. 18, taken on lines 19—19 and 20—20, respectively, of Fig. 18. Fig. 21 is a section taken on line 21—21 of Fig. 22 of the valve which primarily controls the flow of air to the mechanism for advancing the mold tables, and Fig. 22 is a cross-section of the same, taken on line 22—22 of Fig. 21. Figs. 23, 24, 25 and 26 are sectional details of the oscillating valve which determines the duration of the flow of compressed air for packing the glass in the blank mold, Fig. 23 being a longitudinal section of said valve, and Figs. 24, 25 and 26 cross-sections thereof, taken on lines 24—24, 25—25 and 26—26, respectively, of Fig. 23. Figs. 27, 28, 29 and 30 are sectional details of the oscillating valve for controlling the vertical movement of the blow heads of the blank-forming and blank-blowing portions of the machine, Fig. 27 being a longitudinal section of the same, and Figs. 28, 29 and 30 being cross-sections, taken on lines 28—28, 29—29 and 30—30 of Fig. 27. Fig. 31 is a plan view partly in section of the mechanism for opening and closing the blank molds. Fig. 32 is a vertical section, taken on line 32—32 of Fig. 31. Fig. 33 is a sectional detail of the check valve interposed in the air supply leading to the actuating cylinder of the mold-table oscillating mechanism. Fig. 34 is a sectional detail of the treadle-operated valve for controlling the opening and closing of the blank molds, and Fig. 35 is a similar view of the treadle-operated valve for effecting the closing of the blow molds. Fig. 36 is a detail of the portable hand-operated neck mold support and carrier. Fig. 37 is a diagrammatic view of the machine, the lower half of the view indicating the parts of the machine that are beneath the parts shown in the upper half of the view, being in effect a projection of the latter. In this diagram, when the mold carriers are at rest those portions of the air circuits indicated by solid lines are under air pressure and those portions indicated by broken lines are without pressure. In each of the general and detail views, excepting Fig. 5, the parts are in the positions they occupy when the entire machine is at rest and in readiness to start a cycle of operations. The parts illustrated in Fig. 5 show their positions during the operation of expanding a blank within a blank mold.

Referring to the drawings, 2 designates the blank mold carrier or table which is adapted to rotate about the upright hollow post or column 3, being rotatably supported by hub 4 which in turn is rotatable about column 3, all as shown in Fig. 4. 5 is a similar post or column about which rotates the blow mold carrier or table 6 which may be supported from beneath at blowing position E by post 6'. The peripheries of tables 2 and 6 are formed with gear teeth and are geared together by pinion 7 which may be supported by post 8 whereby the carriers are caused to move in unison in response to the intermittent advancing movements imparted to carrier 2 by the mechanism presently to be described. Also, with the carriers separated by wheel 7 they are so spaced apart that the active blank mold at position C and the active blow mold at position D, Fig. 3, are in such relation to each other and to the station of the transfer boy at the side of the machine as to be within convenient reach, and at the same time afford ample space for removing the blank from the blank mold, and for inverting it before placing it in the blow mold. Also, with the carriers thus separated the molds at positions C and D are so spaced apart as to afford opportunity for the heat radiated therefrom to be dissipated instead of the boy being subjected to the heat *en masse* as would be the case if the active molds were mounted on carriers that were immediately geared together. Furthermore, with the molds separated as described it is unnecessary for the boy to expose his hands or arms to the hot metal of either mold which would be almost unavoidable if the molds were in close relation to each other.

*Blank molds and blow mold opening and closing mechanism.*—Each of the sectional or two-part blank molds 9 is mounted to open and close on a base plate 10 secured to carrier 2, Fig. 5, the mold sections swinging on hinge pin 11 and at their lower ends recessed to embrace boss 12 on plate 10, the boss, plate, and carrier 2 apertured vertically to accommodate the nipple and plunger mechanism presently to be described. The lower portions of mold sections 9 are also recessed at 13 to embrace the neck mold 14. The upper end of the blank mold is countersunk to receive the combined blowing head and mold closure 15. The registering cavities of molds 9 and 14 combine to provide a cavity of proper size and shape for a glass bottle blank, neck mold 14 imparting final shape to the neck end of the blank, and also serving as a support or carrier for transferring the blank from a blank mold to a blow mold, as will presently be described. The sectional blank mold is shown in detail in Fig. 36 in connection with its handle-forming arms 16 which are pivoted together in scissors fashion with an interposed spring 17 operating to hold the mold closed but being readily compressed by hand pressure to open the mold and release it from the neck of the bottle following the blowing operation.

For opening and closing the blank molds the halves of each mold are connected by links 20, Figs. 1 to 4 and 31, with a bar 21 which carries the upstanding roller knob 22, the latter being adapted to be embraced by the cam lip 23 depending from wing 24 of cam plate 25, the latter being adapted to oscillate about column 3, being actuated by piston 26 and cylinder 27 which is supported on the column by bracket 28, Figs. 1 and 2. The oscillating plate 25 is circular excepting for the flat portion 25' against which knob 22 is drawn by cam lip 23 when opening the mold and which operates to project bar 21 and its knob outwardly for closing the mold when released from lip 23. Air is admitted to and exhausted from the outer and inner ends of cylinder 27 through pipes 29 and 30, respectively, the flow of air being controlled as will presently be described. After each mold has been advanced from the blank-forming position B, Fig. 3, to position C, the admission of air through pipe 29 to the outer end of cylinder 27 operates to turn cam plate 25 and wing 24 into the positions shown in Figs. 31 and 37, thereby opening the mold. This flow of air is controlled manually and not automatically by a treadle-operated valve 31 as will presently be described. It will be understood, however, that the intermittent rotations of carrier 2 move the blank molds and their knob-carrying bars 21 around plate 25 and out of engagement with lip 23 with the result that the flat portion 25' operates to close the mold, and the concentric peripheral portion of said plate holds the mold closed throughout its next blank-forming cycle.

*Glass cut-off mechanism.*—At position A, Figs. 3 and 37, a closed blank mold 9 is presented to receive a proper quota of glass which is deposited therein from a punty or gathering iron, not shown, the latter being rested in notch 35' in the stem of valve 35, Figs. 3 and 8. In the mold charging position A the mold is immediately beneath a shears 36, the arms of which are pivoted to a bracket 37 on column 3. The shears are opened and closed by means of a cylinder 38 which is also supported by bracket 37, piston rod 39 of the cylinder being connected to the shear arms by links 40 for closing and opening the shears upon the inward and outward movements of rod 39, as will be understood. The flow of air to cylinder 38 is controlled by the oscillating valve 41, air being passed from this valve to the inner end of the cylinder through pipe 42 and to its outer end through pipe 43, Fig. 37. Normally, compressed air is in communication with the inner end of the cylinder and the shears are held in open position. But at the instant the glass is to be severed, *i. e.*, when the operator sees that just the right amount has passed beneath the plane of the shears, he moves the punty rod in a direction to open valve 35 and establish communication between the compressed air pipe 44 and pipe 45, the latter leading from valve 35 to valve 41. This flow of air raises piston 46, Fig. 7, and oscillates valve 41 in the reverse position from that shown in Figs. 7, 9, 10 and 11, thereby admitting air from compressed air line 47 through pipe 43 to the outer end of cylinder 38 and at the same time causing pipe 42 to exhaust through valve 41, whereupon piston rod 39 is projected for closing the shears and severing the glass. Valve 35 closes automatically when relieved of pressure from the gathering iron, thereby again disconnecting pipe 45 from the compressed air main 44, but in the meantime the described operation of valve 41 has resulted in a flow of air which causes carrier or table 2 to advance the freshly charged mold from the charging position A to the blank forming position B. The mechanism for accomplishing this movement of the carrier will now be described.

*Mold table advancing mechanism.*—Hub 4 which supports carrier 2 also operates to rotate it, an arm 50 projecting from the upper end of the hub carrying the spring-raised bolt 51 which is adapted to enter successively a circular series of apertures 52 in the carrier, Fig. 4. A link 53 connects an arm 4' of hub 4 with a head 54 carried by the piston rod 55, Fig. 6. Piston 56 at one end of this rod operates in the power cylinder 57, and piston 58 at its opposite end is confined in the compression cylinder 59. The normal or starting position of the mechanism is as shown in Figs. 4 and 6, with hub 4 and carrier 2 locked together by bolt 51 and with piston 56 at the outer end of its cylinder. The oscillation of valve 41 through the medium of the gathering iron, as above described, passes compressed air from main 47 into pipe 60. This pipe is open through the first butterfly valve 61 and the air passes through the latter to the upper end of a cylinder 62, Figs. 37 and 4, and depresses piston 62' thereof. The lowering of this piston pulls down the swinging arm 63, and the latter, in turn, oscillates valve 64, this valve being shown in detail in Figs. 21 and 22. This oscillation of valve 64 establishes communication between compressed air main 47 and pipe 65, and as one branch 66 of this pipe leads to the outer end of cylinder 57 air is admitted to effect the forward traverse of rod 55. Interposed in pipe 66 is the check valve 67, Fig. 33, which fully opens for the admission of air but which is adapted to settle into the nearly closed position of Fig. 33 upon the backward traverse of rod 55 and piston 56, thereby graduating the exhaust and cushioning the return movement. The check valve may be adjusted by a set screw 68 for either increasing or decreasing the exhaust flow as may be desired. A vertically movable lock bolt 69 coöperates with aperture 52, Fig. 4, of carrier 2, being lowered out of engagement with the carrier by the depression of arm 63 to which the bolt is connected, Fig. 4, and the raising of piston 62' elevates the bolt into locking position, thereby holding carrier 2 immovable during the charging and blank-forming operations at positions A and B.

A branch 70 of pipe 65 extends to the lower end of cylinder 71, Figs. 2, 4 and 37, and the piston rod 72 of this cylinder carries the forked clutch head 73 which is adapted to be raised into the path of the headed lower extremity 51' of bolt 51, with the result that the bolt head is moved into embracing engagement with the clutch when the carrier has completed a forward movement imparted thereto by piston rod 55, and the subsequent lowering of clutch 73 depresses bolt 51, thereby disengaging hub arm 50 from carrier 2 so that the hub may be free to oscillate in a reverse direction when piston rod 55 is retracted, thereby placing bolt 51 in position to snap into another carrier aperture 52 and thereby obtain a fresh hold on the carrier which in the meantime has been held locked by bolt 69.

The forward traverse of piston rod 55 oscillates, successively, the butterfly valve 61 and the butterfly valve 75, Figs. 6, 18, 19, 20, and 37, the forked stems of these valves being engaged by lug 76 depending from head 54, Figs. 1 and 18. A third valve 77 is also actuated by piston rod 55, the forked stem of this valve being engaged by a pin 78 projecting from head 54, Figs. 1, 6 and 37. The functions of these three valves are, in the main, in connection with operating parts that have not as yet been described. However, in the present connection it may be noted that when valve 75 moves from the position shown in Fig. 37 by the forward movement of piston rod 55, air under pressure is admitted from pressure line 47 through pipe 79 to piston 46' of valve 41, Fig. 7, thereby restoring said valve to the position shown in Figs. 7, 9 and 11 and cutting off the supply of air from the outer end of cylinder 38 and admitting air to its inner end through pipe 42, thereby opening the shears as in Fig. 37. Also, with valve 75 thrown from the position shown in Fig. 37, compressed air passes from pipe 79 through pipe 80 to the bottom of cylinder 62, thereby raising arm 63 and restoring valve 64 to the position shown in Fig. 37, and this results in passing compressed air through branch 81 of pipe 48 to the inner end of cylinder 57, and by the same movement placing the outer end of said cylinder in communication with the exhaust through check valve 67 and pipe 66, the position shown in Fig. 37. Piston rod 55 is thereupon retracted and its backward traverse restores valves 75, 61 and 77 to the positions shown in Figs. 6, 18 and 37. And the restoring of valve 64 to normal position again admits compressed air through pipe 48 to the upper end of clutch cylinder 71 which results in depressing the clutch and lowering bolt 51 so that hub 4 is free to oscillate backwardly with rod 55 and piston 56 into starting position.

*Blank mold closure and glass packing means.*—These mechanisms, located at position B, Figs. 3, 4, 5 and 37, operate to close each charged mold when it is advanced from charging position A and to admit air pressure through the top into the upper portion of the mold for packing the glass therein, and the sequence of operations is such that the mold is closed and the glass packed before the coöperating nipple and the plunger are operated at the bottom of the mold.

The cap-like mold closure 15 is movable vertically in the lower end of head 102, with the latter secured to the lower extremity of the tubular rod 103 of piston 104, the latter being operative in cylinder 105. This cylinder may be adjustably supported on column 3 by bracket 106. The lowering of piston 104 seats cap 15 on the charged mold, and the further downward movement of head 102 on the closure after the latter has been seated causes pin 101 on the closure neck to raise and unseat the ball valve 107 in head 102, thereby establishing communication between the tubular closure and the hollow stem 103. At the under side of the closure 15 is the normally open upwardly closing check valve 108, all as shown in Figs. 4 and 5.

Carried by bracket 106 is the bar 109, and supported by opposite ends of this bar are the oscillating valves 110 and 120, valve 110 being shown in detail in Figs. 27 to 30, inclusive, and valve 120 in detail in Figs. 23 to 26, inclusive, these several views indicating the normal positions of the respective valves when the machine is ready to start a cycle of operations, as in Fig. 37. Valve 110 is connected to compressed air main 47, Fig. 37, and normally said valve maintains communication between main 47 and pipe 111 which extends to valve 120, a branch 111' thereof leading to the bottom of cylinder 104, Fig. 4, for holding piston 104 and mold closure 15 raised. The forward movement of the carrier-advancing piston rod 55 having reversed butterfly valve 75 from the position shown in Fig. 37, communication is established between pipe 48 and pipe 112 which leads to piston 113 of valve 110, Fig. 30, in the meantime the air supply through pipe 114 to the other piston 113' of valve 110 having been shut off by butterfly valve 61, the latter having been reversed from the position shown in Fig. 37 by the forward movement of the piston rod 55 just preceding the above described reversal of valve 75. This oscillation of valve 110 shuts off the air from pipe 111 and establishes communication between main 47 and one branch of pipe 115 leading to the top of cylinder 105, with the result that cap 15 is lowered, the blank mold is closed and communication established with tubular stem 103 by the opening of ball valve 107. Stem 103 is normally in communication with main 47 through branch 116, valve 120, and pipe 123, so that as soon as ball valve 107 is unseated air is admitted to the mold past check valve 108 for packing the glass therein preparatory to the nipple and plunger operations at the bottom of the mold, presently to be described.

Simultaneously with the admission of air through valve 110 and pipe 115 for lowering mold closure 15, air is also admitted through pipe 117 to what I term a timing tank 118, and as soon as sufficient pressure accumulates in tank 118 air passes therefrom through the pressure valve 119 and pipe 121 to piston 122 of valve 120, Fig. 24, raising said piston and reversing the position of the valve from that shown in said view. This operation results in shutting off the glass packing air from pipe 123, but the air is not thus shut off until an appreciable time after the closure 15 has been seated, the duration of flow of the glass packing air being determined by the filling of tank 118 and by the adjustment of pressure valve 119. It will of course be understood that the opening pressure of valve 119 at its maximum is not greater than the pressure maintained in main 47. The above described reversal of valve 120 closes communication between pipe 123 and branch 116 of main 47, and at the same instant opens communication between branch 116 and pipe 124 through which air is conducted for operating the nipple and plunger, as will presently be described. Valve 120 is restored to the normal position shown in Figs. 24 and 37 by air being admitted to piston 122' through pipe 111, this following the restoration to normal position of valve 110. Also, the readmission of air to pipe 111 results in the passage of air through branch 111' to the bottom of cylinder 105, thereby raising closure 15 clear of the mold so that the latter may advance to position C.

*Blank forming mechanism.*—This mechanism consists of the means, located beneath the blank mold for shaping the blank after the glass has been packed, and includes a nipple for shaping the edge extremity of the blank neck; a plunger for forming an initial depression in the blank; and means for expanding the blank within the blank mold.

Beneath each blank mold, carrier 2 is equipped with a housing 125 most clearly seen in Figs. 4 and 5, and movable vertically therein is the sleeve-like cylinder 126, from the lower portion of which projects annular flange 127. Projecting upwardly from sleeve 126 is the tubular nipple 128 which fits the vertical central aperture in boss 12 of mold base 10, the nipple and its supporting sleeve being held normally raised by coiled spring 129. A plunger 130 is movable vertically through the nipple and casing 126, being held normally depressed by the coiled spring 131 located within spring 129. A port 132 opens through the outer face of housing 125 and extends upwardly through the carrier and plate 10 to the nipple-confining passage. A lateral port 133 in the nipple is adapted to establish communication between port 132 and the plunger-confining bore of nipple 128, Fig. 5, the nipple being normally raised and closing this communication as in Fig. 4. When thus raised the nipple is seated against the neck mold and is in position to accurately shape the lip of the bottle when the glass is packed in the mold as above described. The lowering of the nipple to the position shown in Fig. 5 precedes the raising of plunger 130 to the dotted line position of Fig. 5 for forming the initial cavity in the glass, and also precedes the admission of air to port 132 for expanding the blank.

The normally depressed plunger 130 is adapted to be raised momentarily, as in dotted lines in Fig. 5, by the normally depressed lifting head 134 above which the plunger is brought into vertical alinement by its movement along with the blank mold from position A to position B. Head 134 is secured to the upper end of piston rod 135, piston 136 thereof being movable in cylinder 137. Air passes to the upper end of this cylinder through pipe 138 and to its lower end through pipe 139, and both of these pipes are connected to and the flow therethrough is controlled by the oscillating valve 140, shown in detail in Figs. 12 to 16, also Fig. 37. The means for actuating valve 140 and the result accomplished when it is moved from the normal position of Figs. 12 to 16 and 37 will be presently described.

As above noted, the upper extremity of nipple 128 forms the lip edge of the blank, and it is desirable to have the nipple retracted from the position shown in Fig. 4 to that of Fig. 5, and hence out of contact with the glass when the plunger is projected thereinto, thereby preventing the plunger from dragging the extremity of the glass and distorting the lip edge as it would do if the nipple were in raised position. When a charged mold moves to position B, sleeve flange 127 is positioned beneath arm 141 of rock-shaft 142, the other arm 141' of the shaft being connected to piston 143 of cylinder 144, and air is admitted to the lower end of this cylinder through pipe 124 from valve 120 as heretofore described, thereby raising piston 143 and depressing the nipple to the position shown in Fig. 5. Air is admitted to the top of cylinder 144 through pipe 145 for depressing the piston and restoring arm 141 to raised position in readiness for the next operation, and also releasing nipple 128 so that it may respond to the upward pressure of spring 129.

Air from pipe 124 is utilized for raising plunger 130, but its passage to the bottom of cylinder 137 is delayed momentarily so that the nipple may be depressed in advance of raising the plunger. This delay is accomplished by the timing valve 146, Figs. 17 and 37, which is interposed in pipe 147 leading from pipe 124 to valve 140, the air being admitted to the bottom of valve 146 and its passage to valve 140 delayed until pressure of the inflowing air raises the floating piston 146' sufficiently to establish a passage through valve 146. In the meantime, the compression in the outer portion of cylinder 59 resulting from the advance of cushioning piston 58 has forced air under pressure through pipe 148 to the shifting piston 149 of valve 140, thereby reversing said valve from the position shown in Fig. 12 and establishing communication between pipe 147 and pipe 139 leading to the bottom of cylinder 137, so that after the air has obtained a clear passage through timing valve 146 and valve 140 it flows to the lower end of cylinder 137 and elevates plunger 130, as in dotted lines in Fig. 5. A branch 150 of pipe 124 extends to piston 149' of valve 140, Fig. 12, and when this piston is raised it oscillates the valve back to normal position, closing the above described communication between pipes 147 and 139. The flow of air through pipe 150 is controlled by the slide valve 151, Figs. 4 and 5, which is secured to and hence raises and lowers with the plunger-actuating piston 136, with the result that when said piston and the slide valve have been elevated as in dotted lines in Fig. 5, port 151' opens pipe 150 and immediately the valve shifting piston 149' is raised and valve 140 restored to normal position, cutting off the supply of air through pipe 139 to the lower end of cylinder 137 and admitting air to pipe 138 through the upper end of said cylinder, thereby immediately depressing the plunger.

*Blank expanding mechanism.*—After the plunger has been operated as above described to form the initial depression in the glass, and with the nipple in lowered position as in Fig. 5, air is admitted through ports 132 and 133 to the bore of nipple 128 and thence to the plunger-formed cavity for expanding the glass within the blank mold as in Fig. 5, and the air controlling mechanism for accomplishing this expansion will now be described. Referring to Figs. 4 and 5, at position B the outer end of port 132 is in alinement with the ported nipple 155 which has a slight longitudinal movement in head 156, the latter being secured to rod 157 of piston 157' movable in cylinder 158. Air is admitted to the outer end of this cylinder through pipe 159 for advancing piston 157' and head 156 and pressing nipple 155 into engagement with the outer edge of housing 125, Fig. 5, thereby establishing closed communication between nipple 155 and port 132. This advancing movement retracts the nipple 155 against spring 161 and unseats ball valve 162 so that blank-expanding air may flow from pipe 163, connected to head 156, through port 132 and into the blank for expanding the latter. Pipe 163 leads from the compressed air main 47, Fig. 37. For advancing piston 157' air is admitted through pipe 159 from branch 138' of pipe 138, the flow being controlled by valve 77 and being had only when valve 77 is in the reverse position from that shown in Fig. 37. Air for retracting piston 157' and thereby closing ball valve 162 is admitted to cylinder 158 through pipe 160. Pipe 160 extends through valve 77 to the inner end of the carrier actuating cylinder 57, Fig. 37, and is closed only when said valve is in the reverse position from that shown in Fig. 37. Hence it will be seen that ball valve 162 is open only momentarily for the passage of air from pipe 163.

*Blow molds and blow mold operating mechanism.*—The several sectional blow molds 170 are mounted on the blow mold carrier 6, Figs. 1, 2, 3 and 37. A blank is removed from an open blank mold at position C, the neck mold being manually lifted and the blank inverted before inserting the blank in a blow mold at position D. The blow mold is then closed and carries the blank to position E where the bottle is fully blown, and from thence to position F where the mold is opened by hand and the blown bottle removed. The mechanism for operating the blow molds is much the same as the above described mechanism for operating the blank molds, excepting that the latter are opened by air pressure, whereas the blow molds are opened by hand. The sections of each blow mold are connected by links 171 with a bar 172 carrying a roller 173 which engages the edge of cam plate 174, the latter being rotatable about column 5, a cylinder 175 being supported on said column by bracket 175' and having its piston 176 connected to plate 174.

When the mold carriers are at rest they are in the position shown in Fig. 3 with the blank mold closed at position C and with the blow mold open at position D, and with pistons 26 and 176 at the outer ends of their respective cylinders. The operator then depresses treadle valve 31 thereby closing communication to pipe 30 and opening communication between main 47 and pipe 29 leading to the outer end of cylinder 27. This results in moving piston 26 and the blank mold cam plate 25 into the position shown in Fig. 37, thereby opening the blank mold through the medium of wing 24, as heretofore described. The operator then removes the blank by means of the portable neck mold, Fig. 36, inverts the blank to place its neck end uppermost, and positions it in the partially open blow mold which is in readiness to receive it at position D. Immediately upon placing the blank in the blow mold the operator depresses treadle valve 177, Figs. 35 and 37, thereby admitting compressed air from main 47 through pipe 178 to the outer end of the cylinder 175, with the result that the blow mold cam plate 174 is moved to the position shown in Fig. 37, and the blow mold at position D is closed around the blank so that the latter is in readiness for blowing upon the next intermittent rotation of carrier 6 which moves it from position D to position E. With cam plate 174 operated as described, it serves to close the blow mold at position D immediately upon placing the blank therein, thereby maintaining the glass in proper condition for the final blowing operation when it reaches position E. The rotation of cam plate 174 accomplished by the outward stroke of piston 176 has no effect on the mold at position E. Said movement does, however, place cam plate 174 in the most advantageous position for freely opening the mold by hand at position F for removing the blown bottle.

Pipe 30 leads from treadle valve 31, Figs. 34 and 37, to the inner end of cylinder 27 for actuating the blow mold cam plate 25 as above described. A branch 30' of this pipe 30 extends to the inner end of cylinder 175 for operating the blow mold cam plate 174. Pipe 30 is normally open through valve 31, as in Fig. 37, so that when valve 64 is operated by the lowering of swinging arm 63, air then admitted from main 47 to pipe 65 flows through treadle valve 31 and pipe 30 to the inner ends of cylinders 27 and 175, with the result that cam plates 25 and 174 are moved from the position shown in Fig. 37 to that shown in Fig. 3, thereby closing the blank mold at position C after the blank has been transferred to the blow mold at position D, and the corresponding movement is imparted to cam plate 174, but as carrier 6 is then turning in the same direction, said cam plate continues to hold the mold closed while moving from position D to blowing position E.

*Blowing mechanism coöperating with blow molds.*—Referring to Figs. 2 and 37, the blowing head 180 is secured to the lower end of the tubular piston rod 181, the latter being provided with piston 182 in cylinder 183, and this cylinder may be adjustably supported on column 5 by bracket 184. Depending from and movable vertically in head 180 is the tubular nipple 185 which is lowered by piston 182 adapted to register with and rest on neck mold 14. This seating movement of nipple 185 raises and opens valve 186, thereby passing compressed air from tubular piston rod 181 into the blank for blowing the same into final form. The air which accomplishes this blowing is conducted from main 47 through branch pipe 187 to the upper end of piston rod 181.

For raising and lowering the blowing head, air is supplied to the lower end of cylinder 183 through pipe 188 which is a branch of pipe 111, and to the upper end of said cylinder through pipe 189 which is a branch of pipe 115, Fig. 37. Compressed air is normally in communication with the lower end of the cylinder through pipe 188, and this supply is cut off and the air admitted through pipe 189 to the upper end of the cylinder only during the brief interval above described when valve 110 is reversed from the position shown in Fig. 37 for passing air through pipe 115 to the top of cylinder 105 for lowering the blank mold closure 15. Thus it will be seen that the same air circuits are utilized for lowering the blank mold closure 15 and the blow mold blowing head 186 and for raising said parts from their operative positions, the result being that they lower and raise in unison, performing their respective mold coöperating functions when the molds and mold carriers are at rest.

The piping for the various air circuits is shown complete only in the diagram of Fig. 37, although much is shown in other views, notably Figs. 1, 2, 3 and 6, and with the terminals of the various pipes shown in the detail views it is believed the construction and operation may be readily understood. The tubular columns 3 and 5 provide conduits for such of the air pipes as connect the mechanisms above and below the rotatable mold carriers so that such pipes do not interfere with the movement of the carriers, also they are kept out of the way of the operators.

*General operation.*—Assuming the machine to be at a standstill between intermittent movements of carriers 2 and 3, the following operations are in progress: A blank mold, charged by the preceding operation of position A, is at position B where closure 15 is lowered on the mold, as in Fig. 5, and, successively, the glass is packed in the mold, the initial cavity is formed by plunger 130, nipple 128 is manipulated as described, the blank is expanded as in Fig. 5, and the blank mold closure 15 is raised clear of the mold as in Fig. 4. A blank formed by these operations is transferred at position C to a blow mold at position D, the treadle valves 31 and 177 being operated in connection with this transfer, as above described; a final blowing operation is proceeding at position E; a blown bottle is being removed at position F; and a charge of molten glass is being placed in a blank mold at position A, and the operation of valve 35 by the gathering iron or punty used in this mold charging operation results primarily in operating the shears and in starting the next intermittent movement of the carriers. Also, when the carriers are at rest the mold table advancing mechanism is returning to the position shown in Fig. 37 for obtaining a fresh hold on carrier 2, and this backward movement also results in restoring valves 61, 75, and 77 to the positions shown in Fig. 37, these valves being immediately operated by said mechanism. When the carriers are in motion for repositioning the several molds the principal mechanism then in action is that associated with cylinder 57 and piston rod 55, the forward or carrier-advancing traverse of rod 55 also operating to reverse valves 61, 75 and 77 from the positions shown in Fig. 37. In this general statement reference is not made to the movements of sundry valves and other parts, some of which operate when the carriers are at a standstill, and others while they are in motion, as it is believed that the functions of the several parts, both as to time of operation and coöperating relation, will be understood from the foregoing description.

I claim:

1. In a glass forming machine, the combination of a sectional mold adapted to open and close, a rotatable carrier for presenting the mold successively to charging, forming and discharging positions, means for intermittently rotating the carrier, forming mechanism, an oscillating cam device movable independently of the carrier and adapted to hold the mold closed at the charging and forming positions, and means for oscillating the cam in reverse directions for first opening and then closing the mold after it passes from forming position.

2. In a glass forming machine, the combination of a sectional mold adapted to open and close, a rotatable carrier adapted to present the mold successively to charging, forming and discharging positions, a reversely movable device having sliding connection with the mold and common to the mold in the different positions thereof and adapted to hold it closed at the charging and forming positions, means operatively connecting the mold with said device when the mold is moved from forming position for opening the same when said device is moved in one direction and for closing the mold when said device is moved in an opposite direction, and means for reversely moving said device.

3. In a glass forming machine, the combination of a series of sectional molds adapted to open and close, a rotatable carrier adapted to present the molds successively to charging, forming and discharging positions, a reversely movable device common to the molds in the different positions thereof and adapted to hold them closed in the charging and forming positions, means operatively connecting the molds when at the discharging position with said device for opening them when said device is moved in one direction and for closing them when the device is moved in an opposite direction, manually controlled means for moving said device in a direction to open the molds for the discharging position, and automatically operating means for moving said device in a reverse direction to close the molds.

4. In a glass forming machine, the combination of sectional molds adapted to open and close, a rotatable carrier for moving the molds successively to charging, forming and discharging positions, means for intermittently rotating the carrier, forming mechanism, a cam device movable concentrically with but independently of the carrier and common to the several molds for holding them closed at the charging and forming positions, means providing an interlocking connection at the discharging position between each mold and a cam face of the cam device whereby when the latter is moved in one direction the mold is opened and whereby the mold is closed when the cam device is moved in an opposite direction, and means for moving the cam device in reverse directions.

5. In a machine for producing glass bottles, the combination of horizontally rotatable blank and blow mold carriers arranged side by side, blank molds on the blank mold carrier and blow molds on the blow mold carrier with each blank mold adapted to coöperate with a blow mold during a blank transferring operation, forming mechanisms adapted to coöperate with the molds, the carriers spaced apart to separate the blank and blow molds sufficiently to provide room at the side of the machine for manually transferring a blank from a blank mold to the appropriate blow mold, and gearing meshing with teeth on the spaced carriers for causing them to move in unison.

6. In a machine for producing glass bottles, the combination of horizontally rotatable blank and blow mold carriers arranged side by side, the carriers being circular and provided with peripheral gear teeth and thereby comprising large gear wheels, blank molds on the blank mold carrier and blow molds on the blow mold carrier with each blank mold adapted to coöperate with a blow mold during a blank transferring operation, forming mechanisms adapted to coöperate with the molds, the carriers spaced apart to separate the blank and blow molds sufficiently to provide room at the side of the machine for manually transferring a blank from the blank mold to the appropriate blow mold, and gearing interposed between and meshing with the spaced carriers for causing them to rotate in unison.

7. In a machine for producing glass bottles, the combination of horizontally rotatable blank and blow mold carriers arranged side by side, a circular series of blank molds mounted on the blank mold carrier with said molds arranged to form bottle blanks in inverted position, a circular series of blow molds mounted on the blow mold carrier with said molds arranged for blowing bottle blanks with their neck ends uppermost, forming mechanisms adapted to coöperate with said molds, each blank mold adapted to coöperate with a blow mold during a blank transferring operation, the carriers spaced apart to separate the blank and blow molds sufficiently to provide room at the side of the machine for manually transferring a blank from a blank mold to a blow mold and for inverting it during such transfer, and gearing meshing with teeth on the spaced carriers for causing them to move in unison.

8. In a glass forming machine, the combination of a carrier, an open-bottom mold mounted thereon and movable thereby to and from the forming position, a housing secured to the carrier beneath the mold, a vertically movable plunger and a vertically movable plunger-embracing nipple movable in the housing toward and from the bottom of the mold, automatic means for actuating the nipple and plunger when the mold is in forming position, the housing formed with a port open at its outer end to receive an air connection and at its inner end in controlled communication with the mold through the medium of the nipple, a compressed air conducting head movably mounted at the forming position to register with said port, and means for controlling the flow of compressed air through the head.

9. In a glass forming machine, the combination of a mold carrier, an open-bottom mold mounted thereon and movable thereby to and from forming position, a housing mounted on the carrier beneath the mold, a tubular laterally ported nipple movable in the housing toward and from the mold, a vertically movable plunger extending through the nipple, nipple and plunger automatic actuating means operative when the mold is in forming position, a housing formed with a port adapted at its outer end to receive an air connection and at its inner end adapted to register with the lateral port of the nipple when the latter is in lowered position, a compressed air conducting head movably mounted at the forming position to register with said port, and means for controlling the flow of compressed air through the head.

10. In a glass forming machine, the combination of a mold carrier, an open-bottom mold mounted thereon and movable thereby to and from forming position, a vertically movable plunger beneath the mold, plunger-actuating means, a vertically movable spring-raised nipple normally in operative relation with the lower end of the mold, and vertically movable nipple-depressing means located at the forming position and with which the nipple is brought into operative relation at such position.

11. In a glass forming machine, the combination of a carrier, a mold mounted thereon and movable thereby to and from forming position, and the following described mold coöperating means, viz., means for admitting compressed air to the top of the mold for packing the glass therein, a plunger and a plunger-embracing nipple coöperating with the bottom of the mold and actuating means for the plunger and nipple operative after the glass has been packed, means for admitting compressed air into the bottom of the mold following the operation of the plunger, and means for automatically actuating said several parts when the mold is in forming position for accomplishing the described operations thereof.

12. In a glass forming machine, the combination of a mold, a plunger and a plunger-embracing nipple movable vertically with relation to the mold, compressed air operated devices for actuating the nipple and plunger, a source of compressed air common to said devices and adapted to freely communicate with the nipple operating device, and means for automatically delaying the admission of air to the plunger-operating device until after the nipple-actuating device has been operated.

13. In a glass forming machine, the combination of an open-top mold, vertically movable mold-closing means ported for the passage of air into the mold and including a valve which is adapted to be opened by the seating movement of the closure, a compressed air connection for the closure means, a receiver to which compressed air is admitted simultaneously with seating the closure, and air pressure actuated means operated upon the attainment of predetermined pressure in the receiver for shutting off the supply of compressed air flowing to the closure means.

14. In a glass forming machine, the combination of an open-top mold, ported mold closure means, a source of compressed air in communication with the mold closure means, a valve for controlling the passage of compressed air through the mold closure into the mold, a cylinder and piston for moving the closure means relatively to the mold, means for shutting off the supply of compressed air to the mold closure means, a receiver, a pressure valve controlling communication between the receiver and said last mentioned means, and an air supply common to the cylinder for seating the closure and to said receiver.

15. In a glass forming machine, the combination of a carrier, a mold mounted thereon and movable thereby to and from forming position, carrier actuating mechanism, compressed air actuated forming means operative at said forming position and coöperating with the lower end of the mold, valves actuated by the carrier actuating mechanism when the carrier is at rest for controlling the operations of said forming means, a vertically movable closure for the top of the mold, compressed air actuated means operative at said forming position for controlling the movement of the closure, and valve devices operated by the carrier actuating mechanism for controlling the last mentioned compressed air actuating means.

16. In a glass forming machine, the combination of horizontally rotatable blank and blow mold carriers, gearing connecting the carriers for moving them in unison, carrier actuating means, sectional blank molds mounted on the blank mold carrier, sectional blow molds mounted on the blow mold carrier, a transferable neck mold adapted to coöperate interchangeably with the blank and blow molds, and compressed air actuated means common to the blank and blow molds for opening and closing them.

17. In a glass forming machine, the combination of horizontally rotatable blank and blow mold carriers, gearing connecting the carriers for moving them in unison, carrier actuating means, sectional blank molds mounted on the blank mold carrier, sectional blow molds mounted on the blow mold carrier, a transferable neck mold adapted to coöperate interchangeably with the blank and blow molds, compressed air actuated mechanism for opening and closing the blank molds, compressed air actuated mechanism for opening and closing the blow molds, a source of compressed air for actuating the blank and blow molds simultaneously in one direction, means for automatically controlling the flow of air to said source, and separately operated manually controlled devices for admitting air to said mold operating devices for actuating them in a reverse direction.

18. In a glass forming machine, the combination of horizontally rotatable blank and blow mold carriers, gearing connecting the carriers for moving them in unison, carrier actuating means, sectional blank molds mounted in a circular series on the blank mold carrier, an oscillating compressed air actuated cam device operatively connected to the blank molds for opening and closing them, sectional blow molds mounted in a circular series on the blow mold carrier, an oscillating compressed air actuated cam device operatively connected to the blow molds for closing them, a source of compressed air common to said compressed air actuated devices for moving them in one direction, automatic means for controlling the flow of air through such source, and separately operated devices for controlling the flow of air to said compressed air devices for actuating them in a reverse direction.

19. In a glass forming machine, the combination of a carrier, an open-end mold mounted thereon, an air admitting device adapted to coöperate with the mold, means for admitting compressed air through said device to the mold, a timing tank to which compressed air is admitted, means actuated by compressed air delivered from the timing tank for shutting off the supply of air to the mold, and a pressure valve controlling the discharge of compressed air from said tank.

20. In a glass forming machine, the combination of a mold, a ported closure for the mold, means for moving the closure toward and from the mold, a valved compressed air supply for the mold mounted on the closure with means for opening said supply after the closure has been seated, compressed air actuated means for shutting off said supply, a receiver, a pressure valve interposed between the receiver and said compressed air actuated means for passing air to the latter upon the attainment of predetermined pressure in the receiver, and a source of compressed air common to the receiver and to the valved mold closure.

21. In a glass forming machine, the combination of blank and blow mold carriers geared together for simultaneous movement, blank and blow molds mounted on the respective carriers, mechanical power means adapted to intermittently advance the carriers, one of the blank molds being in charging position and one of the blow molds in blowing position when the carriers are at rest, automatically operating blowing mechanism at the blowing position for coöperating with the successive blow molds, automatically operating blank forming devices adapted to coöperate with the blank molds, starting means for the carrier advancing mechanism, and means controlled by the carrier advancing mechanism for timing the operation of the forming devices that coöperate with the blank molds and for timing the operation of the blowing means.

22. In a glass forming machine, the combination of a mold carrier rotatable about a vertical axis, sectional molds mounted on the carrier, a cam adapted to oscillate about the carrier axis, mold closing devices engaging the cam and actuated by movement of the carrier relatively to the cam for closing the molds, and means for actuating the cam for closing the molds independently of the movement of the carrier.

23. In a machine for producing glass bottles, the combination of horizontally rotatable blank and blow mold carriers spaced apart, gearing interposed between and meshing with teeth on the spaced carriers for causing them to rotate in unison, sectional blank and blow molds mounted on the respective carriers with the spacing apart of the carriers providing sufficient room at the side of the machine for manually transferring a blank from a blank mold to the appropriate blow mold, means common to the blank molds for opening the latter to release the blanks at the blank transferring position and for closing said molds after the blanks have been removed, means common to the blow molds for permitting the latter to open to receive the blanks and to open for discharging the blown articles, said last mentioned means operating to close the blow molds between the blank receiving and article discharging operations, blank forming means adapted to coöperate with the blank molds, and blowing means adapted to coöperate with the blow molds.

In testimony whereof I affix my signature in presence of two witnesses.

FRANK O'NEILL.

Witnesses:
C. E. MONROE,
D. W. MOOR.